United States Patent Office 3,392,037
Patented July 9, 1968

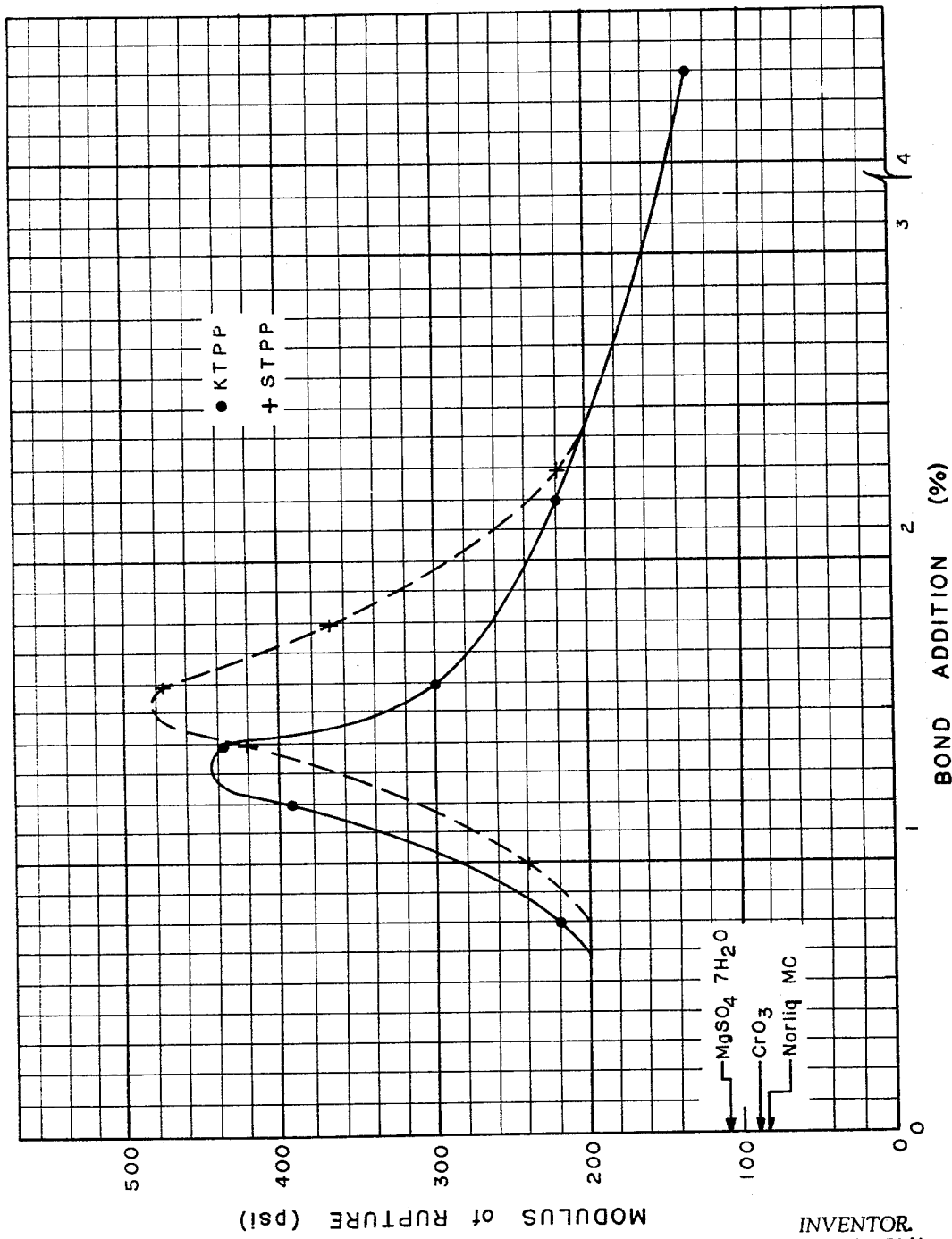

3,392,037
REFRACTORY SHAPE
Joseph E. Neely, Los Gatos, and Marshall L. Mayberry, San Jose, Calif., assignors to Kaiser Aluminum & Chemical Corporation, Oakland, Calif., a corporation of Delaware
Filed July 16, 1965, Ser. No. 472,636
The portion of the term of the patent subsequent to Oct. 11, 1983, has been disclaimed
11 Claims. (Cl. 106—58)

This invention concerns refractory shapes and compositions from which such shapes can be made.

One of the more important properties or characteristics of refractories, for example refractory shapes in either the unfired or fired condition, is their strength at elevated temperatures, for example at temperatures above 1000° C. It will be understood that in the temperature region above about 1000° C. most refractory compositions, in either the chemically bonded, unfired form or in the fired condition, show a decrease in strength, for example as measured by a modulus of rupture test, with increasing temperature. Since these refractory materials are commonly used as structural elements in high temperature structures, for example steel making furnaces, it will be understood that it is desirable to have as high a strength as possible at elevated temperatures.

It has now been discovered, according to this invention, that a refractory with superior strength at elevated temperatures can be made from a composition consisting essentially of, as aggregate, sized nonacid metal oxide refractory grain and, as bond, from about 0.5% to about 2.0%, based on the total weight of the refractory shape, of alkali metal tripolyphosphate ($M_5P_3O_{10}$, where M is an alkali metal).

The aggregate or sized refractory grain will be sized to produce a dense or close packed structure, as is well known in the art. This invention has been found particularly useful with nonacid refractory metal-oxide grains such as periclase, chromite, and mixtures of these with each other. The invention is particularly useful in compositions consisting of approximately equal parts by weight chromite and periclase grains, for example mixtures consisting of from 40% to 60% chromite and from 40% to 60% magnesia.

The alkali metal tripolyphosphate can be any one of or an admixture with each other of tripolyphosphates of the usual alkali metal such as sodium, potassium, lithium, rubidium, cesium, and including ammonium. However, the invention has been found to be particularly effective with sodium tripolyphosphate ($Na_5P_3O_{10}$) and with potassium tripolyphosphate ($K_5P_3O_{10}$), as will become evident from the examples hereinafter given. The alkali metal tripolyphosphate binder has been found to have maximum effectiveness when used in an amount of about 1.1% potassium tripolyphosphate (KTPP) or about 1.4% sodium tripolyphosphate (STPP).

It is known to make refractory gunning compositions containing, together with a plasticizing agent, from 1% to 5% by weight of sodium tripolyphosphate (STPP), as is more fully set forth in U.S. patent application SN 224,-223, filed Sept. 17, 1962, abandoned in favor of Neely et al. Ser. No. 478,980, now U.S. Patent 3,278,320 granted Oct. 11, 1966. Also, it is known to use from 1% to 5% by weight potassium tripolyphosphate (KTPP), together with a plasticizing agent, in making a refractory gunning composition, as is more fully set forth in United States patent application 415,509, filed Dec. 2, 1964, now abandoned. However, it has been discovered, according to the present invention, that not only are smaller amounts of alkali metal tripolyphosphate effective in producing increased strength at elevated temperatures, e.g. 1260° C., in a shaped refractory composition but, more importantly, there is an effective range of amounts of alkali metal tripolyphosphate which is useful to provide the desired strength at elevated temperatures. This is all the more surprising when it is noted that the strength at intermediate temperatures, e.g. 954° C., increases uninterruptedly with increasing amounts of alkali metal tripolyphosphate, at least up to additions as high as 4.3% by weight, as can be seen from the data presented in Table I.

TABLE I

| Composition | Aggregate | Bond Type | Bond Amount | Percent $H_2O$ | MOR (p.s.i.) 954° C. | MOR (p.s.i.) 1,260° C. |
|---|---|---|---|---|---|---|
| 1 | 50P1/50C | Norlig MC | 2.0 | 2.5 | 220 | 185 |
| 2 | 50P1/50C | Norlig MC & VS | 2.0 0.5 | 2.5 | 460 | 205 |
| 3 | 50P1/50C | Norlig MC & $MgSO_4 \cdot H_2O$ | 1.0 1.5 | 3.0 | 260 | 185 |
| 4 | 50P1/50C | $CrO_3$ | 1.6 | 3.0 | | 190 |
| 5 | 50P1/50C | $MgSO_4 \cdot 7H_2O$ | 3.8 | 2.5 | 310 | 210 |
| 6 | 50P1/50C | KTPP | 0.7 | 3.5 | 205 | 225 |
| 7 | 50P1/50C | KTPP | 1.1 | 3.5 | 340 | 395 |
| 8 | 50P1/50C | KTPP | 1.3 | 3.5 | 555 | 435 |
| 9 | 50P1/50C | KTPP | 1.5 | 3.0 | 660 | 295 |
| 10 | 50P1/50C | KTPP | 2.1 | 3.5 | 650 | 215 |
| 11 | 50P1/50C | KTPP | 4.3 | 2.0 | 1,600 | 135 |
| 12 | 50P1/50C | STPP | 0.9 | 4.0 | 420 | 245 |
| 13 | 50P1/50C | STPP | 1.3 | 4.0 | 440 | 430 |
| 14 | 50P1/50C | STPP | 1.5 | 4.0 | 605 | 480 |
| 15 | 50P1/50C | STPP | 1.7 | 4.0 | 570 | 375 |
| 16 | 50P1/50C | STPP | 2.2 | 4.0 | 740 | 215 |
| 17 | 56P1/44C | KTPP | 1.1 | 3.5 | 505 | 625 |
| 18 | 56P1/44C | STPP | 1.3 | 4.0 | 845 | 315 |
| 19 | 56P1/44C | STPP | 1.4 | 4.0 | 550 | 415 |
| 20 | 56P1/44C | STPP | 1.5 | 4.0 | 665 | 385 |
| 21 | 56P1/44C | Glass H | 0.8 | 3.5 | 445 | 230 |
| 22 | 56P1/44C | Glass H | 1.2 | 3.0 | 615 | 245 |
| 23 | 56P1/44C | Glass H | 1.9 | 3.5 | 1,075 | 170 |
| 24 | 50P1/50C | Glass H | 1.5 | 2.5 | 570 | 150 |
| 25 | 56P1/44C | STPP & Glass H | 1.0 0.4 | 4.0 | 945 | 455 |
| 26 | P2 | Norlig MC | 1.5 | 3.5 | 0 | 189 |
| 27 | P2 | $CrO_3$ | 0.77 | 4.5 | 373 | 233 |
| 28 | P2 | KTPP | 1.1 | 3.5 | 461 | 970 |
| 29 | P1 | $CrO_3$ | 0.77 | 3.5 | | 180 |
| 30 | P1 | KTPP | 1.1 | 3.5 | 565 | 530 |

P1 = Periclase containing 96% MgO.
P2 = Periclase containing 98% MgO.
P3 = Periclase containing 80% MgO.
C = Chrome ore.
Norlig MC = A powdered calcium magnesium sulfonate.
VS = Volatilized silica.
Glass H = A long chain polyphosphate.
KTPP = Potassium tripolyphosphate ($K_5P_3O_{10}$).
STPP = Sodium tripolyphosphate ($Na_5P_3O_{10}$).

Compositions 1 through 25 of Table I were made up with the indicated weight proportions of periclase and chrome ore as aggregate. The periclase (P1) used had the following typical chemical compositions: 1.1% CaO, 2.1% $SiO_2$, 0.3% $Al_2O_3$, 0.4% $Fe_2O_3$, 0.3% $Cr_2O_3$ and 95.8% MgO, by difference. The chrome ore or chromite had the following typical chemical composition: 18.4% MgO, 0.4% CaO, 5.3% $SiO_2$, 29.0% $Al_2O_3$, 14.5% FeO, and 32.4% $Cr_2O_3$. All this refractory aggregate passed a 4 mesh screen and all the chromite was of the size retained on a 28 mesh screen; 63.6% of the periclase passed a 100 mesh screen. The indicated type and amount, given as a weight percent of the total composition, of binders were added to the refractory aggregate. Each composition was mixed with the amount of water indicated, which was experimentally determined to give the maximum bulk density when the composition was pressed into the shape of a refractory brick about 9″ x 3″ x 4½″ at a pressure of 5 tons per square inch. For STPP this amount of water was about 4% of the total weight of the dry ingredients and for KTPP about 3.5%.

Compositions 1 through 5 are indicative of typical prior art compositions using conventional cold setting or room temperature binders. (Norlig MC is a powdered calcium magnesium sulfonate manufactured by the Marathon Division of the American Can Co.) It can be seen that the modulus of rupture of these compositions at 1260° C. is less than it is at 954° C. and is around 200 p.s.i. Compositions 6 through 11 indicate the effect of varying percentages of KTPP. It can be seen that the modulus of rupture at 954° C. of these compositions increases with increasing amounts of KTPP up to the maximum amount added, 4.3%. However, the modulus of rupture at 1260° C. can be seen to pass through a maximum as increasing amounts of KTPP are added. This effect is graphically illustrated in the attached figure, which shows modulus of rupture at 1260° C. as a function of the amount of alkali metal tripolyphosphate added. It should be noted that in the case of compositions 6 and 7, the 1260° C. modulus of rupture is actually greater than that found at 954° C. This is to be contrasted with the general decrease in strength at higher temperatures shown by the prior art compositions (1 through 5). Furthermore, the maximum 1260° C. modulus of rupture (MOR) for the KTPP-containing compositions is seen to be about twice that obtained for prior art compositions.

Compositions 12 through 16 show the effect of different percent additions of STPP as the binder, the 1260° C. MOR going through a maximum which is more than twice the strength obtained with the prior art compositions.

Compositions 17 through 20 illustrate compositions according to this invention with a slightly different weight ratio of periclase to chrome ore in the aggregate.

Compositions 21 through 24 were made using a long chain polyphosphate as binder, the particular material used being sold by FMC Corp. under the trade name Glass H. This material is a sodium polyphosphate having an average chain length of 21 phosphorous atoms. These compositions made with Glass H indicate that the enhanced elevated temperature strength found with the tripolyphosphates is not found in all polyphosphates but is peculiar to the tripolyphosphates, which have 3 phosphorous atoms.

However, although a long chain polyphosphate such as Glass H is not effective in the practice of this invention when used as the sole bonding agent, it has been found that up to half the weight of the alkali metal tripolyphosphate can be replaced with a long chain alkali metal polyphosphate with advantageous results. Composition 25 is an example of this form of the invention. It can be seen that the modulus of rupture at 1260° C. has the high value obtained with the alkali metal tripolyphosphate binders, and that in addition the 954° C. MOR has a value obtainable only with over 2% alkali metal tripolyphosphate, an amount of tripolyphosphate which leads to severely decreased 1260° C. strength. In this aspect of the invention, in other words, the refractory composition consists essentially of nonacid metal oxide refractory grain and from 0.5% to 2.0% alkali metal polyphosphate, at least half of the weight of the polyphosphate being alkali metal tripolyphosphate, the balance being a long chain alkali metal polyphosphate.

Compositions 28 and 30 are further examples of this invention using entirely periclase as aggregate. The periclase (P1) of composition 30 is that described above, whereas the periclase (P2) used in composition 28 had the following typical chemical composition: 1.1% CaO, 0.4% $SiO_2$, 0.1% $Al_2O_3$, 0.2% $Fe_2O_3$, 0.1% $Cr_2O_3$, and 98.1% MgO, by difference. Compositions 26, 27, and 29 are comparative compositions made with the same periclases (P1 and P2) but with prior art binders. Again, it can be seen that the compositions according to this invention have strengths (MOR) at 1260° C. vastly exceeding those of the prior art compositions. It should also be noted that composition 28 had a 1260° C. MOR exceeding that of other compositions according to this invention given in Table I. The periclase used in composition 28 contained, as a secondary phase, dicalcium silicate. It is believed that the presence of a small amount, up to 20% by weight, of dicalcium silicate as a secondary phase greatly enhances the effectiveness of the alkali metal tripolyphosphate binders of this invention.

The compositions according to this invention have also been found to have outstanding strength properties, in comparison with compositions made with prior art binders, when fired to very high temperatures, for example temperatures of about 1700° C. or higher. These so-called "high fired" refractories are characterized by the fact that, in compositions containing both periclase and chromite, there is direct crystal-to-crystal bonding between the periclase and chromite crystals. Accordingly, such high fired refractories are often referred to as "direct-bonded" refractories. The compositions given in Table II were all formed into refractory brick shapes in the manner described above and then fired at a temperature of about 1700° C. The modulus of rupture of the fired specimens was determined at the temperatures indicated. Compositions 32, 33 and 34 illustrate the use of potassium tripolyphosphate and are to be compared with composition 31, using a conventional prior art bond. It can be seen that the 1260° C. MOR of fired compositions 32 and 33 exceeds that of the prior art composition 31. However, composition 34 indicates that in the fired shape 1.5% KTPP is an excessive amount.

Compositions 37, 38 and 39 illustrate the practice of this invention with KTPP in fired compositions containing only periclase (P2, the 98% MgO periclase described above) as aggregate and are to be compared with compositions 35 and 36, having the same aggregate but a prior art conventional bond. Because of the very high MgO content of the periclase used, the high temperature strength advantages of compositions according to this invention are most evident of 1400° C. The MORs at this temperature of compositions containing KTPP greatly exceed the strengths of prior art compositions, although again maximum strengths are obtained in the fired composition when the amount of KTPP is less than 1.5%.

Compositions 40 and 41 were made with still a third periclase (P3) as aggregate, this periclase having a typical chemical composition as follows: 12.0% CaO, 5.4% $SiO_2$, 0.5% $Al_2O_3$, 0.5% $Fe_2O_3$, 0.3% $Cr_2O_3$, and 81.3% MgO, by difference. Again the greatly increased strength at 1260° C. of the composition according to this invention, compared to a similar composition with a prior art bond, is illustrated. The MOR at 1400° C. for composition 41 shows that the high strength of this composition is maintained at the higher temperature.

TABLE II

| Composition | Aggregate | Bond Type | Bond Amount | Percent H₂O | MOR (p.s.i.) 1,260° C. | MOR (p.s.i.) 1,400° C. |
|---|---|---|---|---|---|---|
| 31 | 50P1/50C | Norlig MC & CrO₃ | 0.73 / 0.73 | 2.7 | 1,985 | |
| 32 | 50P1/50C | KTPP | 0.7 | 3.5 | 2,525 | |
| 33 | 50P1/50C | KTPP | 1.1 | 3.5 | 2,050 | |
| 34 | 50P1/50C | KTPP | 1.5 | 3.0 | 1,430 | |
| 35 | P2 | Norlig MC | 1.0 | 3.0 | | 240 |
| 36 | P2 | Norlig MC | 1.0 | 3.0 | | 308 |
| 37 | P2 | Norlig MC & KTPP | 1.0 / 0.53 | 3.0 | | 975 |
| 38 | P2 | Norlig MC & KTPP | 1.0 / 1.1 | 3.0 | | 992 |
| 39 | P2 | Norlig MC & KTPP | 1.0 / 1.58 | 3.0 | | 361 |
| 40 | P3 | Norlig MC | 1.0 | 3.5 | 1,761 | |
| 41 | P3 | Norlig MC & KTPP | 1.0 / 1.1 | 3.25 | 2,654 | 2,428 |

Alkali metal polyphosphates can be typified by the formula $M_{n+2}P_nO_{3n+1}$, where M represents an alkali metal atom and $n$ is an integer. For purposes of this disclosure, the term "long chain" polyphosphate is intended to mean a polyphosphate where $n$ is 10 or more.

Refractories according to this invention are useful for constructing heat exchange checkers or regenerators for glass furnaces, or in the linings of high temperature metallurgical furnaces, e.g. for constructing open hearth furnaces, especially the roofs of such furnaces, and indeed wherever refractories are useful.

It is an advantage of refractories according to this invention that they show markedly increased strengths at elevated temperatures and that they at the same time exhibit good formed densities.

In the specification and claims, percentages and parts are by weight unless otherwise indicated. Mesh sizes referred to herein are Tyler standard screen sizes which are defined in Chemical Engineers' Handbook, John H. Perry, Editor-in-Chief, Third Edition, 1950 published by McGraw-Hill Book Company, at page 963. For example, a size passing a 100 mesh screen corresponds to 147 microns, and that passing 200 mesh, to 74 microns. Analyses of mineral components are reported in the usual manner, expressed as simple oxides, e.g., MgO, $SiO_2$, although the components may actually be present in various combinations, e.g., as a magnesium silicate.

Having described the invention, what is claimed is:

1. A refractory composition having high strength at elevated temperatures consisting essentially of sized non-acid metal oxide refractory grain selected from the group consisting of magnesia, chromite and mixtures of magnesia and chromite with each other and, as bond, from about 0.5% to about 2.0%, based on the total weight of the composition, of alkali metal polyphosphate, at least half of said alkali metal polyphosphate being an alkali metal tripolyphosphate, the balance of the alkali metal polyphosphate being a long chain polyphosphate.

2. A refractory composition according to claim 1 wherein said long chain polyphosphate has an average chain length of about 21 phosphorous atoms.

3. A refractory composition according to claim 1 containing about 1% alkali metal tripolyphosphate and about 0.5% long chain polyphosphate.

4. A refractory composition according to claim 3 wherein said alkali metal tripolyphosphate is sodium tripolyphosphate and said long chain polyphosphate has an average chain length of about 21 phosphorous atoms.

5. A refractory composition according to claim 4 wherein said refractory grain consists essentially of from 40% to 60% by weight chromite and from 40% to 60% by weight periclase.

6. An unfired shaped refractory article consisting essentially of non-acid grain material in size ranges to provide dense packing, said grain material being at least one member selected from the group consisting of chromite and periclase, and as bonding agent from 0.5% to 2% of an alkali metal tripolyphosphate, said article exhibiting a modulus of rupture at 1260° C. of at least 225 pounds per square inch.

7. A refractory article according to claim 6 wherein said refractory grain is periclase and said periclase contains as a second phase dicalcium silicate.

8. An article according to claim 6 wherein said alkali metal tripolyphosphate is sodium tripolyphosphate.

9. An article according to claim 6 wherein said alkali metal tripolyphosphate is potassium tripolyphosphate.

10. A refractory composition having high strength at elevated temperatures and consisting essentially of periclase grain material containing a small amount, up to 20% dicalcium silicate and as bonding agent from 0.5% to 2.0% of alkali metal tripolyphosphate.

11. A fired, shaped refractory article consisting essentially of non-acid grain material in size ranges to provide dense packing, said grain material being at least one member selected from the group consisting of chromite and periclase, and as bonding agent from 0.5 to 2% of an alkali metal tripolyphosphate, said article having been fired at a temperature of at least 1700° C. and exhibiting a modulus of rupture at 1260° C. of at least 225 pounds per square inch.

References Cited

UNITED STATES PATENTS

| | | | |
|---|---|---|---|
| 2,077,258 | 4/1937 | Pitt et al. | 106—55 |
| 3,093,496 | 6/1963 | Demaison et al. | 106—59 |
| 3,278,320 | 10/1966 | Neeley et al. | 106—58 |

TOBIAS E. LEVOW, *Primary Examiner.*

JAMES E. POER, *Examiner.*